United States Patent Office

2,862,002
SYNTHESIS OF 4-AMINO-3-ISOXAZOLIDONE

Arthur Boller, Andor Fürst, and Stefano Majnoni, Basel, Switzerland, assignors to Hoffmann-La Roche Inc., Nutley, N. J., a corporation of New Jersey No Drawing. Application November 5, 1956
Serial No. 620,188

Claims priority, application Switzerland
November 17, 1955

8 Claims. (Cl. 260—307)

This invention relates to the production of 4-amino-3-isoxazolidone. More particularly, the invention relates to a method for synthesizing 4-amino-3-isoxazolidone and to novel intermediates produced in the synthesis.

According to this invention α-amino-β-chloropropionic acid is converted with phosgene into the N-carboanhydride (i. e., 4-chloromethyl-2,5-dioxo-oxazolidine) which in turn is converted with hydroxylamine or a salt thereof into α-amino-β-chloropropionohydroxamic acid and the latter is cyclized with a basic agent to obtain 4-amino-3-isoxazolidone. The method described may be applied not only to the racemic α-amino-β-chloropropionic acid but also to the optical antipodes of this compound. Depending on the starting material utilized, the intermediates and final product comprise racemic mixtures or one of the antipodes. Racemic mixtures of the intermediates or of the final product may, of course, be resolved into the optically active components. Both racemic and optically active materials are within the scope of the invention.

In the first step of the process, the starting material, α-amino-β-chloropropionic acid, is treated with phosgene, preferably in an inert organic solvent such as dioxane, tetrahydrofuran or toluene. The N-carboanhydride thus produced may be purified, for example, by crystallization from ethyl acetate-petroleum ether with the addition of activated carbon, if necessary.

The N-carboanhydride is reacted with free hydroxylamine or with a hydroxylamine salt, e. g. hydrochloride, sulfate, acetate, etc. at least one of the two reactants being preferably used in solution. About 2 to 4 mols of hydroxylamine per mol of N-carboanhydride are used. During the reaction either material may be present in excess. The temperature is best maintained under about 60° C. Water, methanol, ethanol, propanol, dioxane, ether or tetrahydrofuran may be used as a solvent. The α-amino-β-chloropropionohydroxamic acid obtained by this reaction is slightly soluble in most solvents and precipitates out of the reaction mixture in crystalline form.

The cyclization of the α-amino-β-chloropropionohydroxamic acid with a basic agent may be carried out in water or in organic solvents. The temperature is preferably kept below about 70° C. For the cyclization reaction, an organic base whose hydrochloride is readily soluble in a lower aliphatic alcohol, for example, a tri-lower alkyl amine such as triethylamine, an alkali metal alcoholate such as sodium ethylate or an inorganic base whose halogen salt is soluble in a lower aliphatic alcohol, for example, an alkali metal base such as lithium hydroxide or lithium carbonate may be used. The 4-amino-3-isoxazolidone produced in this manner may be obtained directly in pure crystalline form without freeze drying or without the use of ion exchangers by adjusting the pH after the cyclization to 6.1 to 6.3, for example with a mineral acid such as hydrochloric acid, and then treating with a lower aliphatic alcohol or lower alkyl ketone.

If an organic solvent is used for the cyclization, it is advantageous to use those solvents in which the salt of 4-amino-3-isoxazolidone and the cyclization agent remain in solution whereas the chloride or hydrochloride produced is insoluble. Preferred solvents are, for example, sodium alcoholate in methanol or ethanol. The salt which precipitates, e. g. sodium chloride, is separated from the solution. The solvent is then evaporated, the residue is taken up in water and processed as above.

It is of course understood that the end product may also be isolated, if desired, by means of freeze drying or by the use of suitable ion exchange resins.

Example 1

50 parts by weight of DL-α-amino-β-chloropropionic acid were suspended in 500 parts by volume of dry dioxane. While stirring and heating mildly (35°), phosgene was introduced until the solution cleared. A weak stream of phosgene was introduced for an additional 30 minutes and then the solution was evaporated to dryness at 40–45° C. in vacuo. The dry crystalline residue was dissolved in 250 parts by volume of ethyl acetate at 40° C. and decolorized with 5% by weight of active carbon. The solution was then evaporated to 150–200 parts by volume and treated with an equal volume of petroleum ether whereupon there precipitated the N-carboanhydride, DL - 4 - chloromethyl-2,5-dioxo-oxazolidine, M. P. 136–137° C.

Example 2

50 parts by weight of DL-α-amino-β-chloropropionic acid were suspended in 500 parts by volume of absolute tetrahydrofuran. While stirring and cooling with water, phosgene was introduced for 30 minutes, the cooling was ended and additional phosgene was then added. The temperature rose to about 30° and after an additional 30 minutes the material dissolved. The solution was evaporated to dryness in vacuo (temperature=40° C.). The crystalline residue was dissolved in 250 parts by volume of dry ethyl acetate, the solution was decolorized with 6 parts by weight of active carbon and treated with 400 parts by volume of petroleum ether to obtain as a precipitate DL - 4 - chloromethyl-2,5-dioxo-oxazolidine, M. P. 134–135° C.

Example 3

To a cooled solution of 20 parts by weight of the N-carboanhydride obtained above, in 200 parts by volume of ethanol, there was added at one time with stirring a solution of 14 parts by weight of hydroxylamine in 100 parts by volume of ethanol. A strong evolution of carbon dioxide occurred and after standing at 0° the reaction product crystallized from the clear solution. After washing the product with ethanol and drying at 20° C., the pure DL - α - amino - β - chloropropionohydroxamic acid melted at 105–107° C. (with dec.).

Example 4

A cooled solution (5° C.) comprising 55.6 parts by weight of hydroxylamine hydrochloride, 200 parts by volume of water, 80 parts by weight of triethylamine and 200 parts by volume of ethanol was added as quickly as possible with stirring to a solution of 60 parts by weight of the N-carboanhydride in 400 parts by volume of ethanol at 5° C. A very strong evolution of carbon dioxide occurred. After working up as described in Example 3 there was obtained pure DL-α-amino-β-chloropropionohydroxamic acid, M. P. 105–106° C. (with dec.).

Example 5

20 parts by weight of DL-α-amino-β-chloropropionohydroxamic acid were suspended in 100 parts by volume of water. Over the course of an hour, 65 parts by volume of about 2 N aqueous lithium hydroxide solution were introduced while stirring at room temperature. A clear solution resulted. An additional 50 parts by volume of the base were introduced over the course of an hour. The water was separated by freeze drying, the residue was taken up in 30 parts by volume of water, and the pH of the solution was adjusted to 6.2 with 1:1 hydrochloric acid-water. 150 parts by volume of absolute ethanol were added and the mixture was permitted to crystallize at 0°. The precipitate was filtered off, washed with absolute ethanol and dried to obtain pure DL-4-amino-3-isoxazolidone M. P. 139–140° (with dec.).

Example 6

27 parts by weight of DL-α-amino-β-chloropropionohydroxamic acid were suspended in 500 parts by volume of absolute ethanol and over the course of 40 minutes 190 parts by volume of a sodium ethylate solution (produced from 23 parts by weight of sodium in 1000 parts by volume of absolute ethanol) were introduced while stirring at room temperature. The starting material slowly went into solution. An additional 160 parts by volume of sodium ethylate solution (over 1½ hours) were introduced. The solution was then permitted to stand overnight at 0° C. The solvent was evaporated in vacuo at 40°, the residue was taken up in 60 parts by volume of water and processed further as described in Example 5 to isolate DL-4-amino-3-isoxazolidone, M. P. 142° (with dec.).

Example 7

56 parts by weight of DL-α-amino-β-chloropropionohydroxamic acid were suspended in 200 parts by volume of water. Over the course of an hour there were introduced, while stirring at 35° C., 800 parts by volume of an aqueous solution saturated at room temperature with triethylamine. The solution then became clear. An additional 350 parts by volume of base were introduced over a period of an hour. Water and excess base were separated from the solution by freeze drying, the residue was taken up in 80 parts by volume of water and processed as described in Example 5 to obtain DL-4-amino-3-isoxazolidone.

Example 8

27.7 parts by weight of DL-α-amino-β-chloropropionohydroxamic acid were suspended in 80 parts by volume of water and over the course of an hour 56.8 parts by volume of triethylamine were dropped in while stirring at 30–34° C. A clear solution was obtained. The solution was filtered at 0°, the pH of the solution was adjusted to 6.1 to 6.2 with hydrochloric acid, treated with 800 parts by volume of absolute ethanol and permitted to crystallize at 0°. The precipitate was filtered and washed to obtain crystalline DL-4-amino-3-isoxazolidone.

Example 9

15 parts by weight of D-α-amino-β-chloropropionic acid, $[\alpha]_D^{20} = +15.65°$ ($c = 7$ in water), were suspended in 250 parts by volume of dry dioxane. While stirring and warming gently at about 35° C., phosgene was introduced until the solution became clear. A weak stream of phosgene was then introduced for an additional 30 minutes. The solution was then evaporated to dryness in vacuo at 40–45° C. The crystalline residue was dried for 5 hours in vacuo over solid potassium hydroxide, then dissolved in 80 parts by volume of ethyl acetate at 40° C. The solution was decolorized with 5% by weight of active carbon. Upon treating with 160 parts by volume of petroleum ether, pure D-N-carboanhydride precipitated, M. P. 120–122° C., $[\alpha]_D^{20} = +29°$ ($c = 2$ in ethyl acetate).

Example 10

A solution, cooled to 5° C., comprising 18.2 parts by weight of hydroxylamine hydrochloride, 63 parts by volume of water, 25.1 parts by weight of triethylamine and 200 parts by volume of ethanol were added as quickly as possible while stirring to a cooled solution of 19 parts by weight of D-N-carboanhydride in 63 parts by volume of ethanol. A strong evolution of carbon dioxide occurred. After a while at 0° C. the reaction product precipitated. The D-α-amino-β-chloropropionohydroxamic acid was washed with ethanol and dried at 20° C., M. P. 89–91° C. (with dec.), $[\alpha]_D^{22} = -22.8°$ ($c = 1$ in 1 N hydrochloric acid).

Example 11

8.6 parts by weight of D-α-amino-β-chloropropionohydroxamic acid were suspended in 25 parts by volume of water. Over a period of 30 minutes 17.4 parts by volume of triethylamine were dropped in while stirring at 30–34° C. whereupon the solution became clear. The solution was filtered at 0° C. The solution was adjusted to pH 6.1–6.2 with hydrochloric acid, treated with 250 parts by volume of ethanol and permitted to crystallize at 0° C. The D-4-amino-3-isoxazolidone melted at 156° C. (with dec.), $[\alpha]_D^{22} = +116°$ ($c = 1.0$ in water).

We claim:

1. A process which comprises reacting α-amino-β-chloropropionic acid with phosgene, reacting the product of said reaction with a member of the group consisting of hydroxylamine and salts thereof, cyclizing the reaction product by means of a basic agent to obtain 4-amino-3-isoxazolidone.

2. A process which comprises reacting 4-chloromethyl-2,5-dioxo-oxazolidine with a member of the group consisting of hydroxylamine and salts thereof to produce α-amino-β-chloropropionohydroxamic acid.

3. A process which comprises cyclizing α-amino-β-chloropropionohydroxamic acid with a basic agent to produce 4-amino-3-isoxazolidone.

4. A process which comprises cyclizing α-amino-β-chloropropionohydroxamic acid in the presence of triethylamine in an inert solvent to produce 4-amino-3-isoxazolidone.

5. A process which comprises cyclizing α-amino-β-chloropropionohydroxamic acid in the presence of alkali metal alcoholate in an inert solvent to produce 4-amino-3-isoxazolidone.

6. A process which comprises cyclizing α-amino-β-chloropropionohydroxamic acid in the presence of alkali metal base in an inert solvent to produce 4-amino-3-isoxazolidone.

7. 4-chloromethyl-2,5-dioxo-oxazolidine.

8. α-Amino-β-chloropropionohydroxamic acid.

References Cited in the file of this patent

UNITED STATES PATENTS

| | | |
|---|---|---|
| 2,662,084 | MacDonald | Dec. 8, 1953 |
| 2,772,281 | Holly et al. | Nov. 27, 1956 |

OTHER REFERENCES

Kuehe et al.: J. Am. Chem. Soc., vol. 77, pages 2344–7 (1955).